United States Patent [19]
Liessner et al.

[11] Patent Number: 5,430,537
[45] Date of Patent: Jul. 4, 1995

[54] LIGHT BEAM DISTANCE ENCODER

[75] Inventors: Christopher W. Liessner, Derry, N.H.; Sidney A. Wingate, Concord, Mass.

[73] Assignee: Dynamics Research Corporation, Wilmington, Mass.

[21] Appl. No.: 116,371

[22] Filed: Sep. 3, 1993

[51] Int. Cl.⁶ .............................................. G01C 3/08
[52] U.S. Cl. ..................................... 356/5.1; 342/103; 342/127
[58] Field of Search .................... 356/5; 342/127, 103

[56] References Cited

U.S. PATENT DOCUMENTS

| | | | |
|---|---|---|---|
| 3,022,702 | 2/1962 | Pocher | 356/5 |
| 3,523,735 | 8/1970 | Taylor | 356/106 |
| 3,601,490 | 8/1971 | Erickson | 356/106 |
| 3,619,058 | 11/1971 | Hewlett et al. | 356/5 |
| 3,634,011 | 1/1972 | Scholdstrom | 356/5 |
| 3,645,624 | 2/1972 | Schenkerman | 356/5 |
| 3,677,646 | 7/1972 | Granqvist | 356/5 |
| 3,680,101 | 7/1972 | Granqvist | 343/14 |
| 3,680,964 | 8/1972 | Granqvist | 356/141 |
| 3,724,950 | 4/1973 | Niss | 356/3 |
| 3,743,419 | 7/1973 | Skagerlund | 356/5 |
| 3,748,026 | 7/1973 | Scholdstrom | 350/287 |
| 3,759,616 | 9/1973 | Hildebrand | 356/5 |
| 3,765,764 | 10/1973 | Niss | 356/156 |
| 3,768,911 | 10/1973 | Erickson | 356/169 |
| 3,778,159 | 12/1973 | Hines et al. | 356/5 |
| 3,813,165 | 5/1974 | Hines et al. | 356/5 |
| 3,832,056 | 8/1974 | Shipp et al. | 356/5 |
| 3,874,087 | 4/1975 | Nunlist | 33/275 |
| 3,891,857 | 6/1975 | Wiklund | 250/560 |
| 3,898,007 | 8/1975 | Wiklund | 356/4 |
| 3,900,259 | 8/1975 | Mott et al. | 356/5 |
| 3,958,885 | 5/1976 | Stockinger et al. | 356/139 |
| 3,998,094 | 12/1976 | Martin | 73/114 |
| 4,025,192 | 5/1977 | Scholdstrom et al. | 356/152 |
| 4,053,877 | 10/1977 | Torlesse et al. | 340/258 R |
| 4,068,188 | 1/1978 | Yokoyama | 331/8 |
| 4,097,734 | 6/1978 | Erickson | 250/237 G |
| 4,105,332 | 8/1978 | Hohne et al. | 356/5 |
| 4,108,539 | 8/1978 | Gort et al. | 350/201 |
| 4,146,328 | 3/1979 | Hullein et al. | 356/5 |
| 4,146,927 | 3/1979 | Erickson et al. | 364/560 |
| 4,153,366 | 5/1979 | Mamon et al. | 356/5 |
| 4,165,936 | 8/1979 | Eisenring et al. | 356/5 |
| 4,172,661 | 10/1979 | Marcus et al. | 356/152 |
| 4,205,385 | 5/1980 | Erickson et al. | 364/560 |
| 4,229,102 | 10/1980 | Wiklund et al. | 356/5 |

(List continued on next page.)

OTHER PUBLICATIONS

Alfred F. Gort, "Electronic Distance Measurements With The Hewlett–Packard Model 3800", Apr. 1970.

Keuffel & Esser Co., "Electronic Distance Measuring Equipment", Catalog 10b, Copyright 1973, 1974, by Keuffel & Esser Co.

*Primary Examiner*—Stephen C. Buczinski
*Attorney, Agent, or Firm*—Weingarten, Schurgin, Gagnebin & Hayes

[57] ABSTRACT

A light beam encoder for measuring absolute distance over a linear path with an accuracy of at least that provided by incremental optical encoders, but over longer ranges than can readily be achieved with optical linear encoders due to the difficulty of providing a sufficiently long optical scale with the requisite accuracy and resolution. The resolution provided by the light beam encoder can be approximately 1–10 microns. A high frequency amplitude modulated light beam is reflected by a reflector disposed at the distance to be measured, and the phase lag of the reflected light beam is determined to provide an absolute measure of the distance. The encoder mixes a local oscillator signal generated by a phase locked loop with both a reference oscillator signal and the distance signal. Thus, the heterodyne mixers provide two low frequency signals preserving the phase lag between the two optical signals. In a preferred embodiment, high-resolution computation of the phase lag is accomplished with a microprocessor receiving precise crossover time information indicating time delays and periods over several cycles of the low frequency signals using linear and nonlinear filtering and averaging algorithms.

11 Claims, 6 Drawing Sheets

U.S. PATENT DOCUMENTS

| | | | |
|---|---|---|---|
| 4,274,736 | 6/1981 | Balmer | 356/5 |
| 4,295,201 | 10/1981 | Wiklund | 364/561 |
| 4,332,475 | 6/1982 | Demarest | 356/386 |
| 4,346,989 | 8/1982 | Gort et al. | 356/5 |
| 4,352,556 | 10/1982 | Haefliger et al. | 356/1 |
| 4,355,306 | 10/1982 | Mitchell | 340/347 DD |
| 4,355,895 | 10/1982 | Cairns et al. | 356/141 |
| 4,355,899 | 10/1982 | Nussmeier | 356/349 |
| 4,357,833 | 11/1982 | Wiklund et al. | 73/490 |
| 4,413,904 | 11/1983 | Hamada et al. | 356/5 |
| 4,427,295 | 1/1984 | Nishiyama | 356/371 |
| 4,453,825 | 6/1984 | Buck et al. | 356/5 |
| 4,482,118 | 11/1984 | Hoffmann | 248/180 |
| 4,492,464 | 1/1985 | Bourdet et al. | 356/4.5 |
| 4,516,083 | 5/1985 | Turney | 331/1 A |
| 4,521,112 | 6/1985 | Kuwabara et al. | 356/375 |
| 4,524,389 | 6/1985 | Isobe et al. | 358/188 |
| 4,539,760 | 9/1985 | Marchent et al. | 33/356 |
| 4,553,836 | 11/1985 | Meier et al. | 356/5 |
| 4,560,270 | 12/1985 | Wiklund et al. | 356/5 |
| 4,560,271 | 12/1985 | Fumio | 356/5 |
| 4,606,638 | 8/1986 | Sommargren | 356/351 |
| 4,648,718 | 3/1987 | Sadamitsu et al. | 356/387 |
| 4,678,337 | 7/1987 | Cohen et al. | 356/387 |
| 4,681,433 | 7/1987 | Aeschlimann | 356/5 |
| 4,707,129 | 11/1987 | Hashimoto et al. | 356/4.5 |
| 4,707,683 | 11/1987 | Yao | 340/347 P |
| 4,715,714 | 12/1987 | Gaechter et al. | 356/375 |
| 4,744,653 | 5/1988 | Sano et al. | 356/5 |
| 4,749,960 | 6/1988 | Mower et al. | 331/4 |
| 4,759,623 | 7/1988 | Meier | 356/5 |
| 4,770,526 | 9/1988 | Manhart et al. | 356/5 |
| 4,794,251 | 12/1988 | Scholian | 250/231 SE |
| 4,820,041 | 4/1989 | Davidson et al. | 356/1 |
| 4,827,317 | 5/1989 | Mizushima et al. | 356/73.1 |
| 4,830,319 | 5/1989 | Willoughby | 248/176 |
| 4,852,123 | 7/1989 | Bickley et al. | 375/9 |
| 4,856,027 | 8/1989 | Nakamura et al. | 375/81 |
| 4,870,684 | 9/1989 | Arai et al. | 381/7 |
| 4,872,456 | 10/1989 | Hasson | 128/321 |
| 4,874,238 | 10/1989 | Ochi et al. | 356/1 |
| 4,886,363 | 12/1989 | Jungquist | 356/349 |
| 4,888,564 | 12/1989 | Ishigaki | 331/1 A |
| 4,905,009 | 2/1990 | Ulich et al. | 342/118 |
| 4,907,882 | 3/1990 | Waibel et al. | 356/251 |
| 4,907,886 | 3/1990 | Dandliker | 356/349 |
| 4,920,278 | 4/1990 | Nawata | 307/262 |
| 4,926,050 | 5/1990 | Shemwell | 250/560 |
| 4,929,082 | 5/1990 | Webber | 356/358 |
| 4,961,267 | 10/1990 | Herzog | 33/503 |
| 4,984,898 | 1/1991 | Hofler et al. | 356/358 |
| 5,000,572 | 3/1991 | Nose et al. | 356/356 |
| 5,003,187 | 3/1991 | Zumbrunn et al. | 250/560 |
| 5,022,751 | 6/1991 | Howard | 356/1 |
| 5,033,845 | 7/1991 | Sorimachi et al. | 356/1 |
| 5,046,839 | 9/1991 | Krangle | 356/5 |
| 5,051,934 | 9/1991 | Wiklund | 364/561 |
| 5,052,402 | 10/1991 | Bencini et al. | 128/751 |
| 5,067,282 | 11/1991 | Netzel | 51/165.77 |
| 5,077,557 | 12/1991 | Ingensand | 342/52 |
| 5,125,736 | 6/1992 | Vaninetti et al. | 356/5 |
| 5,150,310 | 9/1992 | Greenspun et al. | 364/516 |
| 5,170,800 | 12/1992 | Smith et al. | 128/751 |
| 5,210,587 | 5/1993 | Ohmamyuda et al. | 356/5 |

LIGHT BEAM DISTANCE ENCODER

FIELD OF THE INVENTION

This invention relates generally to distance measurement apparatus and more particularly, to a light beam encoder for measuring absolute distance without depending on incremental counting.

BACKGROUND OF THE INVENTION

Optical glass scale linear encoders are known for measuring distances along a linear path by detecting light reflected from or transmitted through a linearly extending glass scale. The range of distances over which such encoders operate may be limited due to the difficulty of providing a sufficiently long glass scale with the requisite resolution and accuracy. Another type of linear encoder is a laser interferometer. While this type of encoder generally provides high accuracy and resolution, such encoders require coherent radiation, wavelength-stabilized lasers, are very expensive, depend upon incremental counting of interference cycles, and provide no zero-reference index as a datum point.

Electronic distance measurement systems (EDM) are known for measuring relatively long distances, such as in land surveying. These systems operate by generating an amplitude modulated light beam using a laser or a light emitting diode and determining the distance by the phase lag of the beam returning from a reflector. Phase lag is measured by counting time clock increments between crossovers from the transmitted beam to the received beam, providing resolutions around one millimeter. Coarse measurements are first made using low frequency modulation followed by higher modulating frequencies for the required resolution. Known EDM systems are not capable of achieving very high resolutions and higher resolutions are not needed for EDM use.

SUMMARY OF THE INVENTION

A light beam encoder measures absolute distances over a linear path with an accuracy of at least that provided by incremental linear encoders, but over longer ranges than are readily achievable with optical linear encoders. The resolution achievable with the present light beam encoder is approximately 1-10 microns. A high frequency amplitude modulated light beam is reflected by a reflector disposed at the distance to be measured. The reflected light beam provides a high frequency phase-shifted distance signal, the phase lag of which is indicative of the distance between the light beam source and the reflector. The encoder mixes a local oscillator signal generated by a low-noise, phase-locked loop with both a high frequency reference signal and the high frequency phase shifted distance signal. The phase difference is preserved in the two resulting low frequency signals. In order to achieve the high resolution required for encoder purposes, phase lag is computed from measurements of both time delays and periods over several cycles of the two low frequency signals. In order to accomplish the high resolutions needed for encoder purposes (1-10 microns), signal sensing is accomplished down to basic circuit noise levels and component stability levels, requiring optimal tradeoffs between speed of response and ultimate resolution in position. One embodiment provides adaptive digital filtering yielding fast dynamic response with moderate resolution at high input velocities, but switching to higher resolution with slower response as the motion slows down for final settling.

The present invention uses a light beam produced, for example, by either a laser diode or a light emitting diode. More generally, any collimated light beam can be used in the present invention since it is the phase of the amplitude modulated light beam, as opposed to a coherent optical wavelength phase, that is relevant to the performance of the light beam encoder. The encoder of the invention includes a corner reflector which is movable along the measurement path, and a detector for receiving a laser beam reflected by the corner reflector. The laser beam source is amplitude modulated by a reference oscillator signal and the detector converts the reflected light beam into a high frequency phase shifted distance signal with a phase shift $\beta$ relative to the phase of the reference oscillator signal. In one embodiment, the light beam encoder includes an RF section which provides the reference oscillator signal, a local oscillator signal, and a low frequency phase reference signal.

Also provided is a heterodyne section with a mixer which receives the high frequency phase shifted distance signal and the local oscillator signal, and generates a low frequency distance signal, shifted in phase by the same amount as the high frequency distance signal. The low frequency distance signal is coupled to a stable high resolution crossover detector amplifier (CRA) which yields a square wave signal with high resolution transitions.

A measurement section includes a time interval counter that receives the low frequency distance square wave signal, a phase reference square wave signal, and a high frequency clock signal, which may be derived from the high frequency reference oscillator signal. The time interval counter continually counts the clock signal and latches the count values at the two square wave transition instants of both square wave signals, transmitting the count data to a microprocessor section.

The microprocessor section receives the time instant data and computes the phase angle $\beta$ as a ratio of the delays to the cycle periods between reference and distance signal paths. Redundant and averaged computations are scaled and filtered to provide high resolution distance signals. The computations may also provide compensation corrections from periodic recalibration, if needed, and from air density transducers indicating changing environmental effects on light beam velocity.

BRIEF DESCRIPTION OF THE DRAWINGS

The invention will be more fully understood from the following detailed description, in conjunction with the accompanying figures, in which.

DETAILED DESCRIPTION OF THE PREFERRED EMBODIMENT

Figure 1:
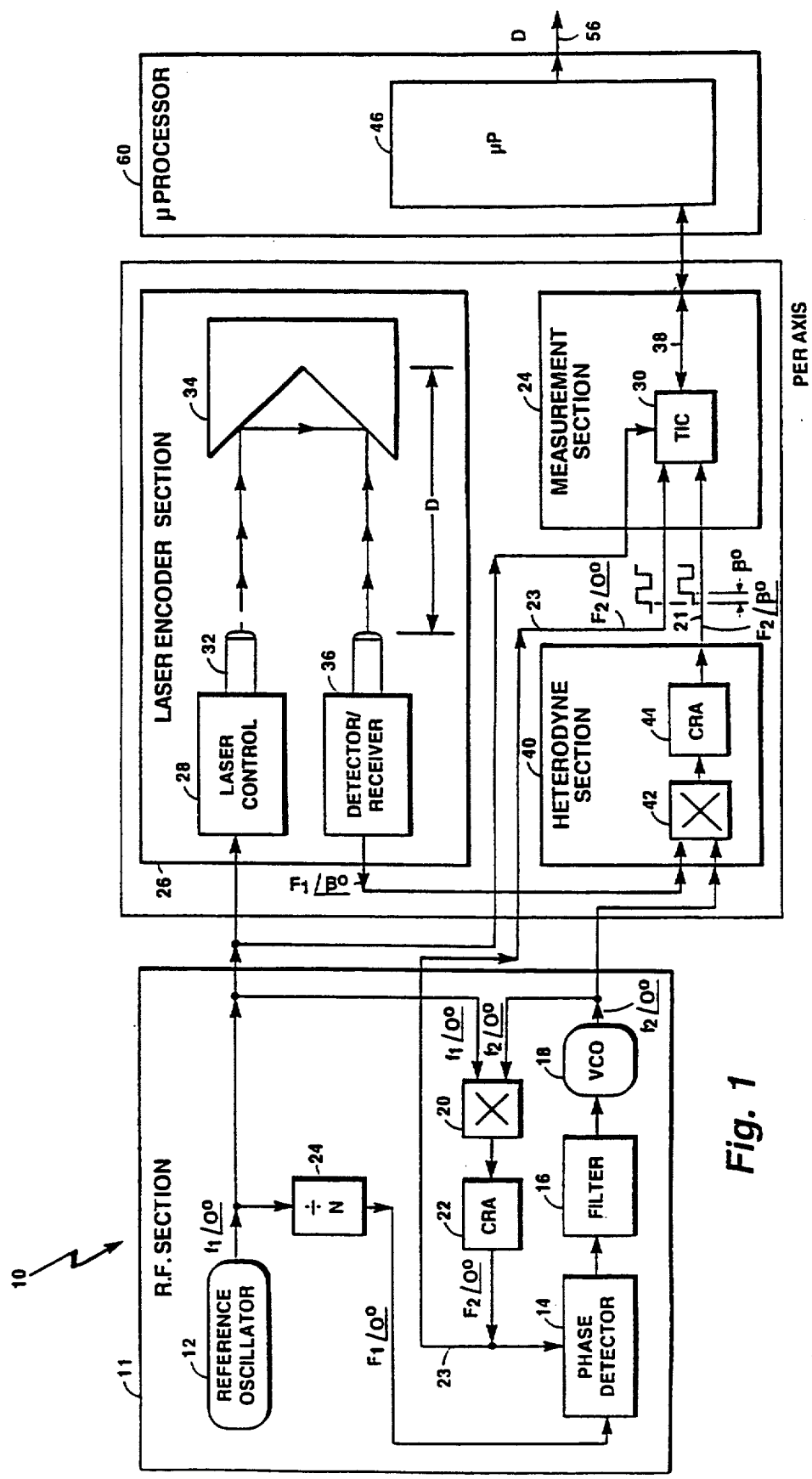
FIG. 1 is a block diagram of an embodiment of the light beam encoder of the invention.

Referring to FIG. 1, a light beam encoder 10 for measuring distance over a linear path includes an RF section 11, a laser encoder section 26, a heterodyne section 40, a measurement section 24, and a microprocessor section 60. A corner reflector 34 is attached to a device located at a distance D from a reference location, where distance D is to be measured. More particularly, the corner reflector 34 is moveable along the linear path in accordance with the device having a distance to be encoded. The distance is measured by determining the phase lag of an amplitude modulated light beam directed toward and reflected by the corner reflector 34, as will be described.

Referring to the encoder section 26, the light beam travels over the total distance 2D with a velocity of $c=3\times 10^8$ meter/second (actual velocity in air is slightly less and is compensated for using air density transducers). Thus the transit time for the beam over the path will be:

$$T_D = \frac{2D}{c} = \frac{2}{3} \times 10^{-8} D \text{ seconds} \tag{1}$$

For example, if D=1.5 meters, the transit time becomes $10^{-8}$ seconds, or 10 nanoseconds. If the amplitude modulation frequency is 100 Mhz with a period of 10 nanoseconds, a phase lag of 360° will be seen at the receiver. For lesser distances, the phase lag becomes:

$$\beta = 360 \times \frac{D}{1.5} \text{ degrees} \tag{2}$$

To detect a distance increment to 10 microns resolution, the corresponding phase lag must be detectable to:

$$\Delta\beta = 360 \times \frac{\Delta D}{1.5} = 360 \times \frac{10^{-5}}{1.5} \text{ degrees} = 0.0024° \tag{3}$$

This is 100× finer resolution than is required by a land surveying EDM for one millimeter resolution. Other modulation frequencies and resolution requirements can be selected, for example:

| f | D | ΔD | ΔB |
|---|---|-----|-----|
| 75 Mhz | 2.0 M/cy | 10 uM | .0018° |
| 300 Mhz | 0.5 M/cy | 1 uM | .00072° |

Stable, high resolution sensing of small phase increments is accomplished with the new technologies of this invention. The encoder operating range can be extended over multiple cycle spans with very low resolution encoding using the well known "V" or "U" scan logic with the light beam encoder high resolution distance readout. A preferred implementation is accomplished within the light beam encoder by periodic switching of the reference oscillator from 100 MHz to 10 MHz, thus providing a 10× 1.5 meter operating range, or 15 meters.

The RF section 11 includes a reference oscillator 12 for providing a reference oscillator signal $f_1$ having a reference phase, such as zero degrees. A phase locked loop mixer is provided and includes a phase detector 14, a filter 16, a voltage controlled oscillator (VCO) 18, a mixer 20, and a crossover detector amplifier (CRA) 22. The crossover amplifier 22 (as well as crossover amplifier 44 discussed below) provides signal conversion for detecting low level voltage crossovers and creating very fast slewing transitions. For purposes of discussing the overall encoder operation in conjunction with FIG. 1, it shall be assumed that the steady-state reference phase of signal $f_1$ is in fact zero degrees, as shown. The effect of any noise on the phase of reference oscillator signal $f_1$ and others of the encoder generated signals will be discussed below in conjunction with FIG. 2.

Reference oscillator signal $f_1$ is a high frequency signal, e.g., 100 MHz, and is coupled to a counter-divider 24 that divides the frequency (and phase) of the reference oscillator signal $f_1$ by a factor N, for example N=150,000, to provide a signal $F_1$ of frequency $f_1/N$. The phase detector 14 of the phase locked loop receives the signal $F_1$ and after filtering, connects to the VCO 18 which produces the local oscillator signal $f_2$. Mixer 20 receives the signal $f_2$ and the reference oscillator signal $f_1$ and produces a filtered difference signal $(f_1-f_2)$ which is squared up by the crossover amplifier 22 whose output $F_2$ feeds back to the phase detector 14. Thus, the frequency and phase of $F_2$ is made to track $F_1$, at 666.7 Hz. The steady-state phase of signal $f_2$ is ideally locked to that of the reference oscillator signal $f_1$ and thus is ideally zero degrees, as indicated in FIG. 1. The frequency of signal $f_2$ is related to that of signal $f_1$ by the relation:

$$f_2 = f_1 - f_1/N \tag{4}$$

Any phase noise on reference signal $f_1$ is reproduced in the local oscillator signal $f_2$ within the bandwidth of the phase locked loop dynamic response. Consequently the subsequent heterodyne mixing of $f_1$ and $f_2$ to determine the distance phase lag will minimize differential phase noise. Furthermore any phase noise originating from within the VCO 18 is fed back through the mixer 20 in the phase locked loop and is thus suppressed. Note that, in prior art systems having a conventional phase locked loop, a signal divider is coupled in a feedback relationship between the output of the VCO and an input of the phase detector and thus, the local oscillator noise is not suppressed nor is the phase noise of the reference signal $f_1$ reproduced in signal $f_2$ for cancelling in the heterodyne mixing.

Figure 2:
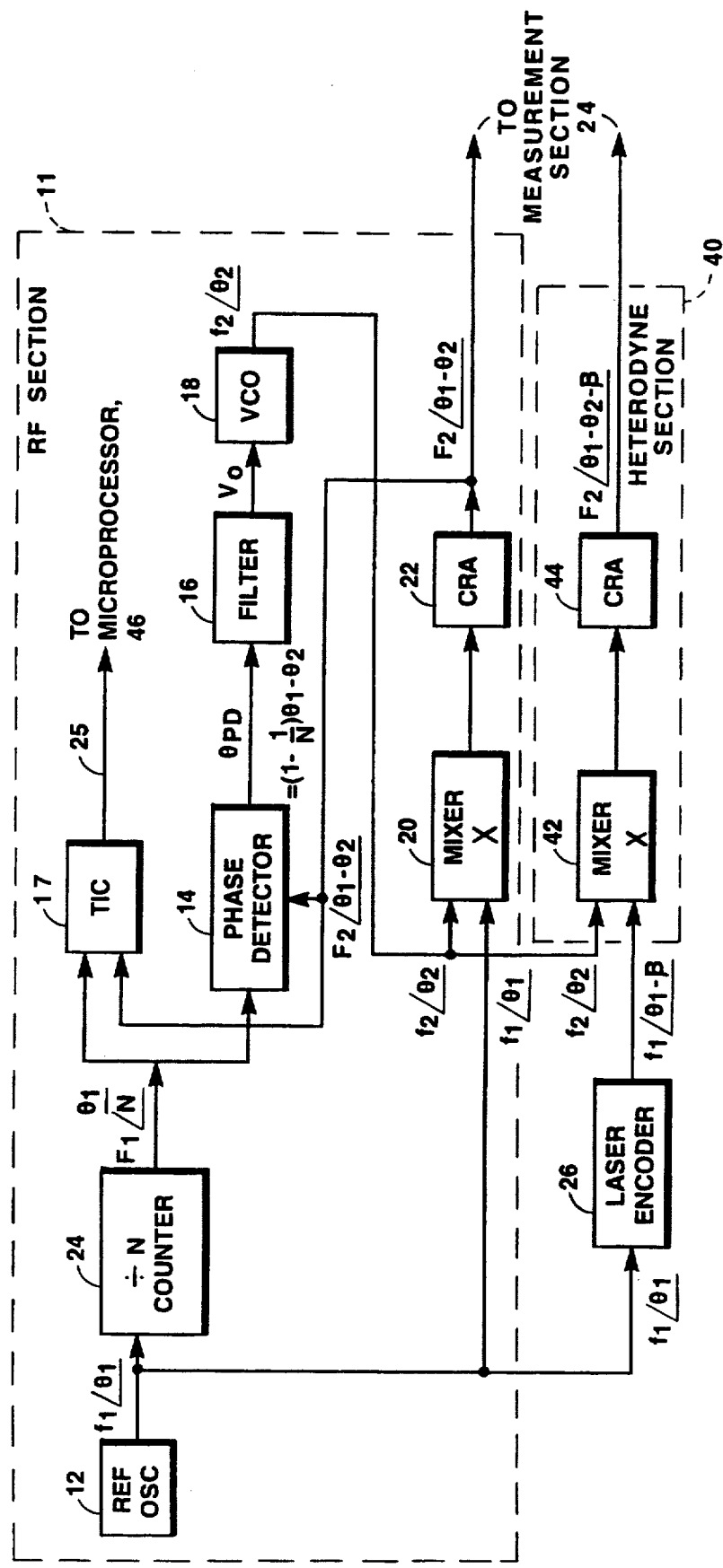
FIG. 2 is a more detailed block diagram of a portion of the light beam encoder of FIG. 1.

The mixer 20 is preferably implemented using a high speed four-quadrant analog multiplier which accepts the two sine wave signals, $f_1$ and $f_2$ and produces output sine waves with sum and difference arguments. The summed frequency wave is eliminated by a filter (not shown) leaving a sine wave at the difference frequency and difference phase. The analog multiplier mixer does not produce any other significant harmonics that might otherwise bias the difference-frequency crossovers. FIG. 2 shows in more detail how phase noise from the reference oscillator and the local oscillator are substantially reduced. The steady-state phase of the reference oscillator is taken to be 0°, thus any noise is labeled $\theta_1$, as shown. The VCO output phase $\theta_2$ tracks the input phase $\theta_1$ and suppresses VCO phase noise so that two inputs to mixer 20 are nearly identical in phase. Thus only differential phase noise should appear at the mixer output.

The mixer output is a sine wave of minimum phase noise and at the difference frequency $(f_1-f_2)$, or $666\frac{2}{3}$ Hz.

A typical amplitude is 0.1 volts, leading to a crossover slope of about 4 μv/10 nanoseconds. In this preferred embodiment, 10 nanoseconds corresponds to a phase increment of 0.0024° and one distance resolution increment of 10 μM. This crossover instant must be preserved in stable, high-gain, low noise amplification. The mixer 20 is followed by the crossover amplifier 22 of special features to accomplish this requirement.

Figure 3:
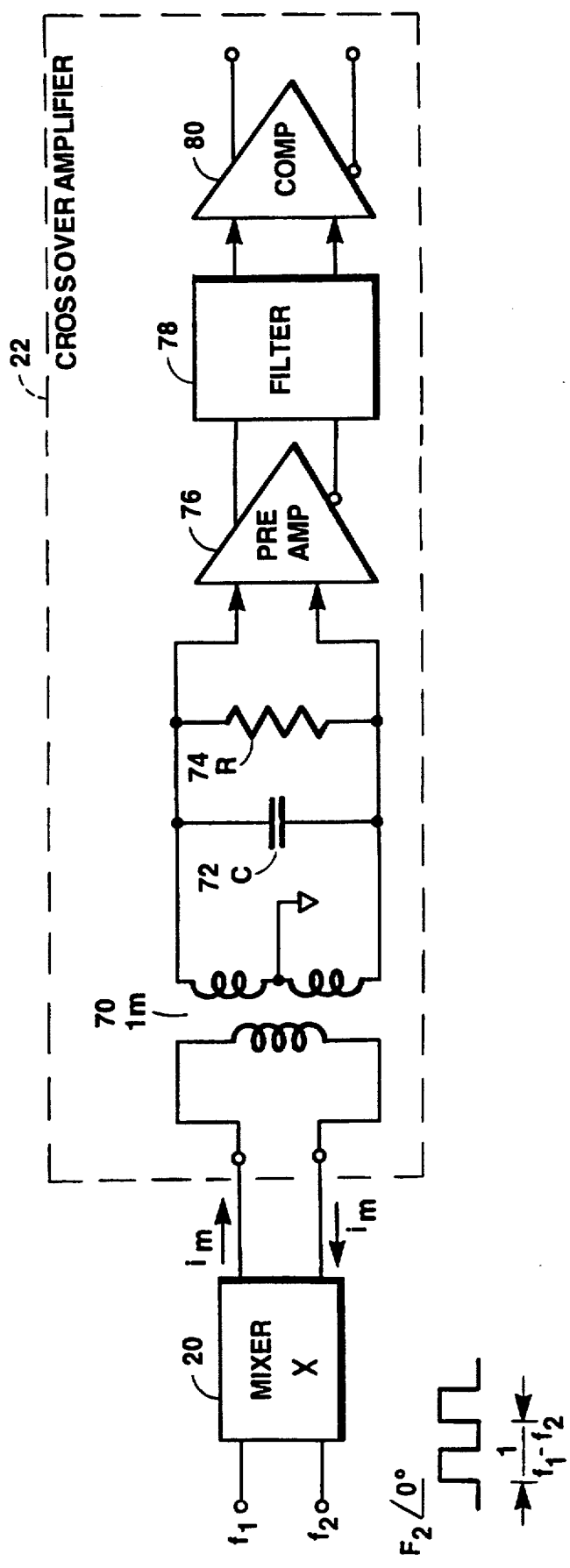
FIG. 3 is a block diagram of an exemplary crossover amplifier of FIG. 1.

FIG. 3 provides a functional schematic diagram of the crossover amplifier 22. The mixer output is a sine wave current that is coupled to an input of preamplifier 76 with a step-up transformer tuned to the difference frequency, 667 Hz. The step-up factor and the circuit loading are selected to provide optimal crossover-to-noise ratio, including consideration of the preamp input noise sources. The preamp 76 must supply high gain and no saturation transients and minimum noise. The preamp must be very fast and have a high gain in order to recover rapidly from saturation as the signal approaches the crossover instant from both directions. Such a stage will involve high frequency gaussian noise which must then be minimized in filter 78, but with enough bandwidth to pass the crossover transient during the short duration of linear amplification between excursions from the saturation rails. In some applications the preamplifier may be chopper stabilized to prevent a changing dc offset from biasing the crossover instant. The filter output couples to the comparator 80 input terminals, where, with further linear gain in the crossover region, the output square waves are formed with very high resolution transition instants in order to define the crossover instants as required by the encoder application. Note in particular that the signal at the preamp input is still a linear sine wave with optimal signal-to-noise ratio, but with a relatively slow voltage rate at the transition. From this point on the signal must be direct-coupled to make the transition instant independent of any dissymmetry of the subsequent saturated signals. Also very important is the use of differential signal coupling and amplification all the way from the mixer output to the comparator output, instead of single-sided transmission that would be vulnerable to common-mode bias and noise effects. Thus crossover amplifier 22 provides the high-gain, low-noise sensing of the mixer signals with a time resolution on the order of a nanosecond and excursion resolution in the microvolt range. Time jitter of the output transitions becomes a direct function of the ratio of the noise amplitude to crossover voltage rate. For example, a noise amplitude of 2 microvolt RMS and a signal crossover rate of 4 μV/10 nanoseconds would result in a time jitter of 5 nanoseconds. Noise may be both random gaussian type and non-random systemic noise from the electronic implementation. Subsequent digital filtering and averaging to achieve high resolution computation of the distance phase angle is described below.

Referring again to FIG. 2, the heterodyne section 40 receives the local oscillator signal $f_2 < \theta_2$ from the RF section 11 along with the phase-shifted distance signal $f_1 < \theta_1 - \beta$ from the laser encoder section 26. Mixer 42 and CRA 44 function as do mixer 20 and CRA 22 above in the RF section, producing a high resolution square wave $F_2 < \theta_1 - \theta_2 - \beta$ that now includes the phase shift $\beta$ proportional to the distance D. Note that both this square wave and the reference square wave $F_2 < \theta_1 - \theta_2$ contain the residual differential phase noise $(\theta_1 - \theta_2)$ that is small magnitude compared with either $\theta_1$ or $\theta_2$, entirely because of the mixer type phase lock loop described above. The subsequent determination of the phase difference $\beta$ between these signals further reduces phase noise error in computing the distance output.

Figure 4:
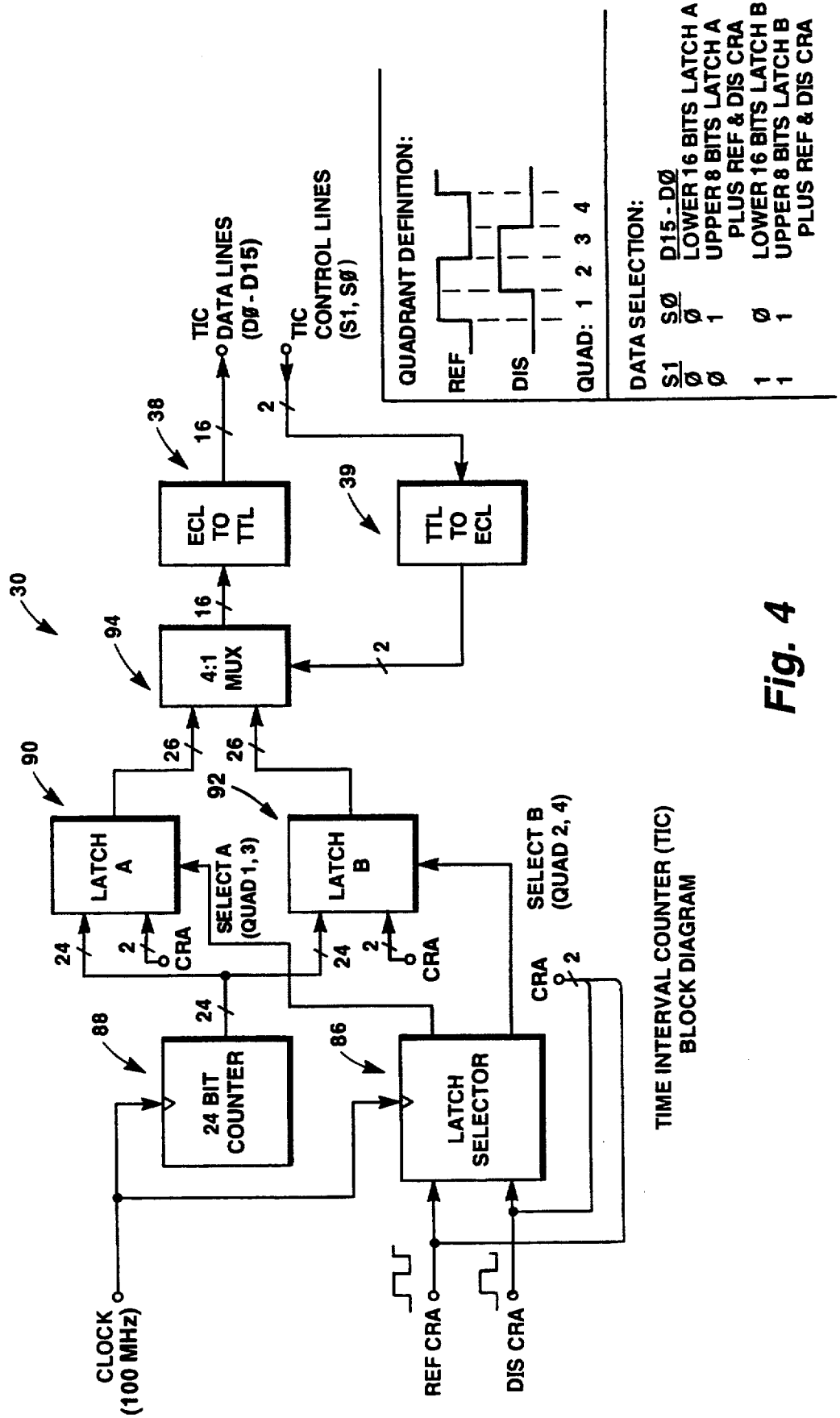
FIG. 4 is a schematic of an exemplary time interval counter of FIG. 1.

FIG. 1 shows the two square waves coupled to the measurement section 24, where all transition instants are continuously measured and passed on to the microprocessor section 60. FIG. 4 is a block diagram of the high speed time interval counter 30. A 24-bit counter 88 continuously runs in response to a clock input signal. In the preferred embodiment, the clock signal is derived from the reference oscillator signal $f_1$, at 100 MHz. The counter 88 is preferably implemented by Motorola ECLPS or other high speed ASIC devices. The parallel output of counter 88 is bussed to a pair of high speed latches, 90 and 92, that are enabled alternately by successive transitions of the two square waves from CRA 22 and CRA 44. In FIG. 4, the square wave from CRA 22 is labeled REF CRA and the square wave from CRA 44 is labeled DIS CRA. Along with the parallel output of the counter 88, the states of both square waves are latched into latches 90 and 92.

The alternate latching of signals into latch 90 and 92 is accomplished in latch selector 86 by XORing the CRA square waves, using the XORed signal to trigger latch 90 and the complement XORed signal to trigger latch 92. The XORed signal and complement are also synchronized to the clock signal, but on the opposite transition required to make the counter increment; this ensures the counter is not in the middle of a transition when the output is latched.

The output of the latches, each of which has a 24-bit latched count and 2 bits for the latched CRA states, are fed into the 4:1 multiplexer 94. The multiplexer 94 provides a 16 bit output, and each of the four choices of input selection is also 16-bits wide. Input selection of multiplexer 94 is determined by control signals from the microprocessor section 60. Input selection is scanned by the microprocessor in ascending order such that lowest 16 count bits from latch 90 are first. Next selected are the higher 8 count bits from latch 90, plus 2 bits for the representative CRA states. The additional 6 bits for this input selection are not used. The third multiplexer input selection are the lowest 16 count bits from latch 92. Last selected are the higher 8 count bits from latch 92, plus 2 bits for the associated CRA states. The 6 remaining bits for the last input selection are also not used. A section of FIG. 4 outlines the multiplexer input (data) selection.

Note that in the preferred embodiment, the interval counter up to the multiplexer 94, uses ECL signals. The output of multiplexer 94 is altered to TTL signals, using ECL-to-TTL converter 38, to interface with the microprocessor section 60, since a very broad selection of microprocessors operate using TTL signals. Also, the multiplexer control signals from the microprocessor section are changed from TTL signals to ECL signals, using TTL-to-ECL converter 39. The reason for using ECL signals and components in the time interval counter is to provide the fastest counting and latching possible.

Figure 5:
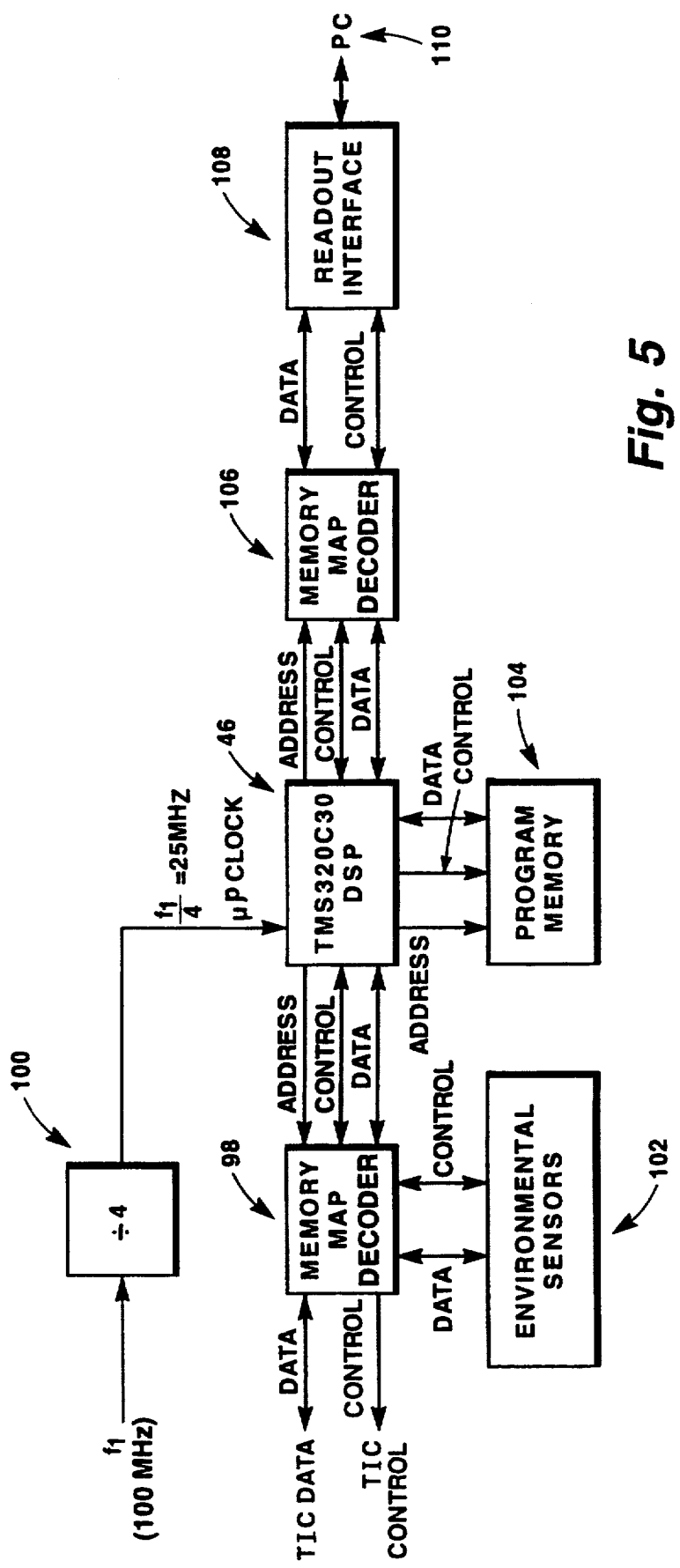
FIG. 5 is a block diagram of an exemplary microprocessor section of FIG. 1.

The microprocessor section 60 can be almost any microprocessor with the appropriate interface logic to the time interval counter, environmental sensors, and readout. FIG. 5 is a block diagram of an exemplary microprocessor section 60. In the preferred embodiment, microprocessor 46 is a Texas Instruments TMS320C30 Digital Signal Processor. Program code, which implements scanning for the time interval data, inputs the environmental data, and executes the algorithms for calculating distance, as well as passing the calculated distance to the readout interface 108, is contained in program memory 104. The microprocessor is provided a 25 MHz clock, which in the preferred embodiment can be derived from $f_1$ through the divider 100.

Memory map decoder 98 provides the microprocessor 46 with an interface to the time interval counter 30 as well as the environmental sensors. Time interval data, plus the corresponding CRA states are polled by the microprocessor 46 by first sending through the memory map decoder the multiplexer input selection, then reading the associated time interval data (as referred to in FIG. 4).

Through memory map decoder 106, the microprocessor 46 can access the readout interface 108. In the preferred embodiment, the readout interface passes the computed distance data to PC 110. Although with the appropriate interface any computer can be connected, this example refers to an IBM compatible computer.

Figure 6:
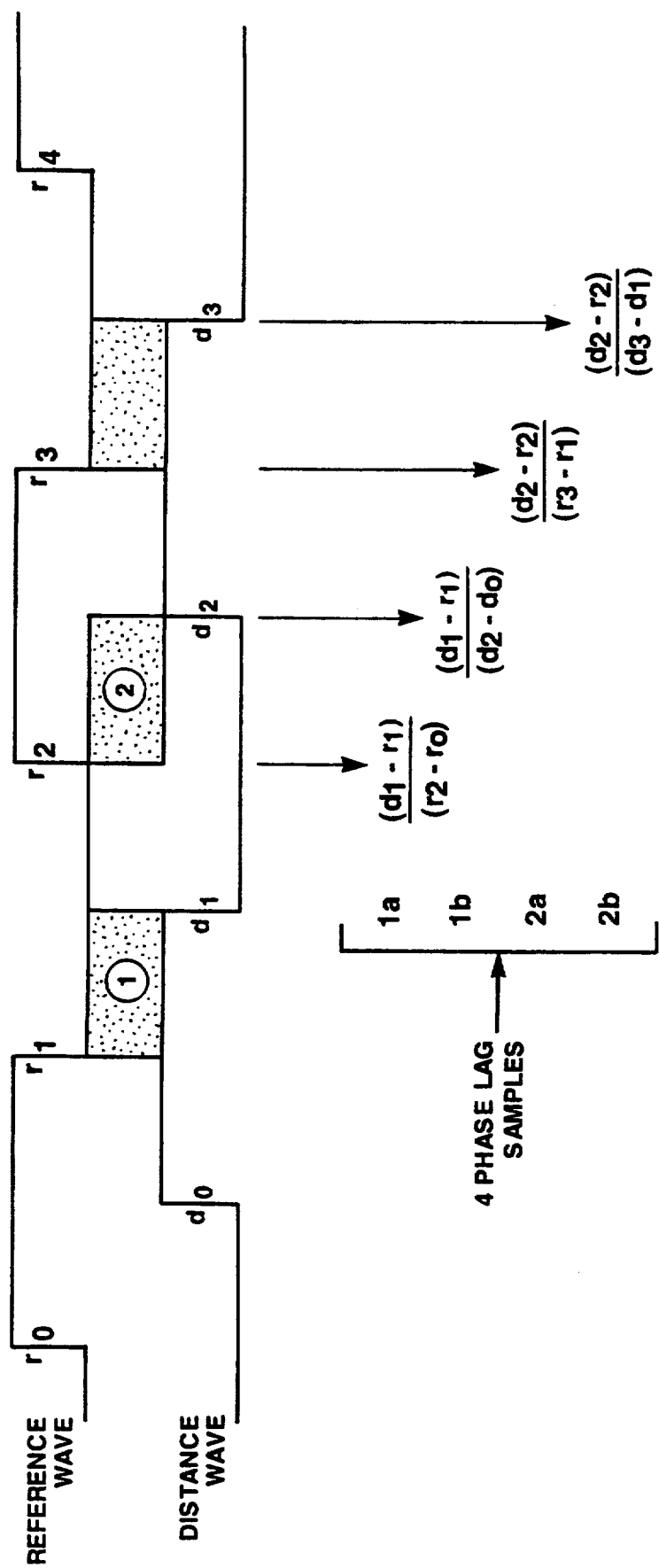
FIG. 6 is a timing diagram of an exemplary square wave transition sampling and computing algorithm.

FIG. 6 shows a timing diagram of the reference and the distance square waves and illustrates an efficient algorithm for computing phase angle in the presence of noise. The timing diagram shows about two cycles of the reference wave $F_2 < 0°$ and the lagging distance wave $F_2 < \beta°$. For clarity the lag is shown at about 90°, but may be any amount from zero up to a whole cycle. The transition instants are labeled $r_0$ to $r_4$ for the reference wave and $d_0$ to $d_3$ for the distance wave. At each transition a counter reading is latched and passed on to the microprocessor section. The absolute count values are unimportant because computations of delay and cycle periods are all made from difference readings. All transitions are subject to noise shifts in either direction. In each cycle there are two intervals where time lag may be measured: from rising edge to rising edge and from falling edge to falling edge, as shown by the shaded areas. In order to distinguish phase lag from simple time delay, computations are made of the ratio of each delay interval to the enclosing cycle periods from both measured wave forms. Thus four phase lag samples are computed and averaged in each cycle to minimized noise and offset effects, see FIG. 6. Furthermore, additional averaging over numbers of cycles provides additional filtering at the expense of reducing readout rates. In the described embodiment, the square wave frequency is 667 Hz and a readout at each cycle would result in an equivalent Nyquist bandwidth of 333 Hz. Many current applications can be served with averaging over 8 cycles which provides a low error spread of a few microns RMS and a readout every twelve milliseconds. Further smoothing for higher resolution, where needed, is available from the microprocessor with recursive digital filtering and correspondingly slower response time.

A distinction is made here between quantized digital resolution, e.g. the 10 μM of the described embodiment, and the expected noise error spread of a particular model encoder. Without noise, any digital signal will involve a quantization error of uniform distribution between ±0.5 quanta with the associated standard deviation of about 0.3 quanta. If the signal involves other noise it should be separately specified and may be root-sum-squared with the basic quantization error. The above discussion of noise tradeoffs in the light beam encoder does not refer to digital quantization.

Another microprocessor task is to scale distance output data to the actual span corresponding to one complete cycle of modulation. In the described embodiment this distance is 1.5 meters, with assumed velocity of light of $3 \times 10^8$ meters/second. Actual velocity depends upon the ambient air density and is a function of temperature and pressure. The actual one-cycle distance span is $$D_s = \frac{c}{2f_1} 1.498545 \times \qquad (4)$$

$$(1 + 0.525 \times 10^{-6} \times \Delta T - 0.9 \times 10^{-6} \times \Delta P)$$

where $\Delta T = (T-59)°F.$, and $\Delta P = (P-29.92)$ 0.1"H$_g$ Temperature and pressure transducers sense the ambient values of these air variables, transmit to the microprocessor and the correct span is computed and multiplied by the phase lag ratio to generate the distance output.

Other embodiments may make use of this scaling feature. The light beam may be switched either automatically or manually into a fixed, accurately known reference optical path for calibration purposes. The resulting distance output can be compared with the known reference path distance and the scale factor corrected.

Another embodiment may provide substantially increased filtering on the computed distance output in order to realize higher resolution in distance readout, however such filtering limits dynamic response to fast changing input motion. An adaptive system is accomplished by first computing input velocity from the unfiltered distance signal (the microprocessor will divide successive distance readings by elapsed time) and then switch in the extra filtering for high resolution only after the input motion slows down for final positioning. With this adaptive filtering feature, the LBE may become the position feedback element in a rapid response servo system, which response need only be compromised as the velocity decreases near the final destination.

Other modifications and implementations will occur to those skilled in the art without departing from the spirit and the scope of the invention as claimed. Accordingly, the above-description is not intended to limit the invention except as indicated in the following claims.

We claim:

1. A light beam encoder for measuring distance between a light beam source and a device along a linear path comprising:

a reflector coupled to said device;

a light beam source for amplitude modulating a light beam and directing said amplitude modulated light beam towards said reflector;

a light beam detector for receiving said amplitude modulated light beam reflected by said reflector and for providing a high frequency phase shifted distance signal;

a mixer for shifting the frequency of said high frequency phase shifted distance signal to a lower frequency and maintaining the phase of said high frequency phase shifted distance signal to provide a low frequency distance signal;

a measurement circuit for measuring the time interval between successive transitions of said low frequency distance signal and a reference signal to provide a measurement signal;

a processor, receiving said measurement signal for generating a distance output signal representing said distance between said light beam source and said device in response to said measurement signal with a resolution of approximately 1–10 microns;

a reference oscillator providing a reference oscillator signal, wherein said light beam is amplitude modulated in accordance with said reference oscillator signal and wherein said reference signal is derived from said reference oscillator signal and has a phase substantially identical thereto; and a phase locked loop including a phase detector, a voltage controlled oscillator, and a second mixer coupled in a feedback relationship with said phase detector and said voltage controlled oscillator, said voltage controlled oscillator generating a local oscillator signal, wherein said second mixer receives said reference oscillator signal and said local oscillator signal to provide said reference signal.

2. The encoder recited in claim 1 wherein said first and second mixers comprise analog multipliers.

3. The encoder recited in claim 1 wherein said measurement circuit measures a ratio of the time interval between successive transitions of said low frequency distance signal and said reference signal to a cycle period to provide said measurement signal.

4. The encoder recited in claim 3 wherein said ratio is measured four times within a cycle and averaged to provide a cycle averaged ratio and said measurement signal is provided in response to said cycle averaged ratio.

5. The encoder recited in claim 4 wherein a plurality of cycle averaged ratios corresponding to a plurality of cycles are averaged to provide said measurement signal.

6. The encoder recited in claim 1 further comprising a first crossover amplifier receiving an output signal from said first mixer to convert said first mixer output signal to a square wave to provide said low frequency distance signal having a transition instant substantially identical to the transition instant of said mixer output signal and a second crossover amplifier receiving an output signal from said second mixer to convert said second mixer output signal to a square wave to provide said reference signal having a transition instant substantially identical to the transition instant of said mixer output signal.

7. The encoder recited in claim 6 wherein said first crossover amplifier includes a preamplifier receiving said first mixer output signal through a transformer to provide a differential amplified signal and a comparator receiving said differential amplified signal to provide said square wave distance signal and wherein said second crossover amplifier includes a preamplifier receiving said second mixer output signal through a transformer to provide a second differential amplified signal and a comparator receiving said second differential amplified signal to provide said square wave reference signal.

8. The encoder recited in claim 7 wherein said measurement circuit comprises a time interval counter including a pair of latches and a multiplexer, each one of said latches receiving said square wave reference signal and said square wave distance signal for latching said signals in accordance with a latch selection signal and coupling said latched signals to said multiplexer, wherein said measurement signal comprises selected ones of said latched signals coupled to outputs of said multiplexer.

9. A light beam encoder for measuring distance between a light beam source and a device along a linear path comprising:

a reflector coupled to said devices;

a light beam source for amplitude modulating a light beam in accordance with a reference oscillator signal and directing said amplitude modulated light beam toward said reflector;

a light beam detector for receiving said amplitude modulated light beam reflected by said reflector and for providing a high frequency phase shifted distance signal, wherein the phase difference between said reference oscillator signal and said high frequency phase shifted distance signal is proportional to said distance between said light beam source and said reflector;

an RF section for providing said reference oscillator signal and a local oscillator signal;

a mixer for shifting the frequency of said high frequency phase shifted distance signal to a lower frequency in accordance with said local oscillator signal to provide a low frequency phase shifted distance signal while maintaining the phase of said high frequency phase shifted distance signal;

a first signal conversion circuit, receiving said low frequency phase shifted distance signal, for converting said low frequency phase shifted distance signal into a high resolution square wave distance signal having a phase corresponding to the phase of the low frequency distance signal;

a measurement circuit for measuring the ratio of the time interval between successive transitions of a high resolution square wave phase reference signal and said high resolution square wave distance signal and the cycle period to provide a measurement signal indicative of the phase difference between said high resolution square wave phase reference signal and said high resolution square wave distance signal, said signal being proportional to the measured distance;

a second mixer for shifting the frequency of said reference oscillator signal to a lower frequency in accordance with said local oscillator signal, to provide a low frequency phase reference signal while maintaining the phase of said reference oscillator signal;

wherein said RF section comprises a reference oscillator for providing said reference oscillator signal, a divider for dividing the reference oscillator signal by a predetermined factor to provide a divided reference oscillator signal, and a phase locked loop, fed by said divided reference oscillator signal, for providing said local oscillator signal; and wherein said phase locked loop includes a phase detector, a voltage controlled oscillator, and said second mixer disposed in a feedback relationship with said phase detector and said voltage controlled oscillator, said second mixer receiving said reference oscillator signal and said local oscillator signal to provide said low frequency phase reference signal.

10. The encoder recited in claim 9 further comprising a second signal conversion circuit, receiving said low frequency phase reference signal, for converting said low frequency phase reference signal into said high resolution square wave phase reference signal having a substantially identical phase with respect to said low frequency phase reference signal.

11. A light beam encoder for measuring distance between a light beam source and a device along a linear path comprising:
   a reflector coupled to said device;
   a light beam source for amplitude modulating a light beam in accordance with a reference oscillator signal and directing said amplitude modulated light beam toward said reflectors;
   a light beam detector for receiving said amplitude modulated light beam reflected by said reflector and for providing a high frequency phase shifted distance signal, wherein the phase difference between said reference oscillator signal and said high frequency phase shifted distance signal is proportional to said distance between said light beam source and said reflector;
   an RF section for providing said reference oscillator signal and a local oscillator signal;
   a mixer for shifting the frequency of said high frequency phase shifted distance signal to a lower frequency in accordance with said local oscillator signal to provide a low frequency phase shifted distance signal while maintaining the phase of said high frequency phase shifted distance;
   a first signal conversion circuit, receiving said low frequency phase shifted distance signal, for converting said low frequency phase shifted distance signal into a high resolution square wave distance signal having a phase corresponding to the phase of the low frequency distance signal;
   a measurement circuit for measuring the ratio of the time interval between successive transitions of a high resolution square wave phase reference signal and said high resolution square wave distance signal and the cycle period to provide a measurement signal indicative of the phase difference between said high resolution square wave phase reference signal and said high resolution square wave distance signals said signal being proportional to the measured distance;
   a second mixer for shifting the frequency of said reference oscillator signal to a lower frequency in accordance with said local oscillator signal, to provide a low frequency phase reference signal while maintaining the phase of said reference oscillator signal;
   a processor, receiving said measurement signal for generating a distance output signal indicative of said measured distance; and
   wherein said first signal conversion circuit comprises a first crossover amplifier, including a preamplifier receiving said low frequency phase shifted distance signal through a transformer and providing a differential amplified signal and a comparator receiving said differential amplified signal and providing said high resolution square wave distance signal having a transition instant substantially identical to the transition instant of said low frequency phase shifted distance signal and wherein said second signal conversion circuit comprises a second crossover amplifier, including a preamplifier receiving said low frequency phase reference signal through a transformer and providing a second differential amplified signal and a comparator receiving said second differential amplified signal and providing said high resolution square wave phase reference signal having a transition instant substantially identical to the transition instant of said low frequency phase reference signal.

* * * * *

UNITED STATES PATENT AND TRADEMARK OFFICE
CERTIFICATE OF CORRECTION

PATENT NO. : 5,430,537
DATED : July 4, 1995
INVENTOR(S) : Christopher W. Liessner et al.

It is certified that error appears in the above-indentified patent and that said Letters Patent is hereby corrected as shown below:

Column 5, line 58, "$f_2 < \theta_2$" should read --$f_2 \angle \theta_2$--.

Column 5, line 60, "$f_1 < \theta_1 - \beta$" should read --$f_1 \angle \theta_1 - \beta$--.

Column 5, line 63, "$F_2 < \theta_1 - \theta_2 - \beta$" should read --$F_2 \angle \theta_1 - \theta_2 - \beta$--.

Column 5, line 65, "$F_2 < \theta_1 - \theta_2$" should read --$F_2 \angle \theta_1 - \theta_2$--.

Column 7, line 27, "$F_2 < 0°$" should read --$F_2 \angle 0°$--.

Column 7, line 28, "$F_2 < \beta°.$" should read --$F_2 \angle \beta°.$--.

Column 11, line 10, "reflectors;" should read --reflector;--.

Column 11, line 26, "distance;" should read --distance signal;--.

Column 12, line 5, "signals said" should read --signal, said--.

Signed and Sealed this

Twenty-sixth Day of March, 1996

Attest:

BRUCE LEHMAN

Attesting Officer     Commissioner of Patents and Trademarks